(12) United States Patent
Segato

(10) Patent No.: US 8,512,842 B2
(45) Date of Patent: Aug. 20, 2013

(54) COMPOSITE MATERIAL HUMAN BODY SUPPORT AND PROCESS FOR MAKING SAME

(75) Inventor: Stefano Segato, Vicenza (IT)

(73) Assignee: Selle Royal S.p.A., Pozzoleone (IT)

( * ) Notice: Subject to any disclaimer, the term of this patent is extended or adjusted under 35 U.S.C. 154(b) by 363 days.

(21) Appl. No.: 12/293,429

(22) PCT Filed: Mar. 19, 2007

(86) PCT No.: PCT/IB2007/050941
§ 371 (c)(1), (2), (4) Date: Sep. 27, 2008

(87) PCT Pub. No.: WO2007/107945
PCT Pub. Date: Sep. 27, 2007

(65) Prior Publication Data
US 2009/0061146 A1    Mar. 5, 2009

(30) Foreign Application Priority Data
Mar. 21, 2006 (IT) .............................. VI2006A0080

(51) Int. Cl.
*B32B 3/00* (2006.01)
*B32B 27/00* (2006.01)

(52) U.S. Cl.
USPC ............. 428/68; 156/242; 297/199; 297/214; 297/215.16

(58) Field of Classification Search
USPC .................... 156/242; 297/199, 214, 215.16; 428/68
See application file for complete search history.

(56) References Cited

U.S. PATENT DOCUMENTS

| 4,761,843 | A | | 8/1988 | Jay |
| 5,121,962 | A | * | 6/1992 | Weber et al. .................. 297/214 |
| 5,169,469 | A | | 12/1992 | Feeley |
| 5,252,373 | A | * | 10/1993 | Ganske et al. .................. 428/68 |
| 5,397,162 | A | | 3/1995 | Huang |
| 6,409,865 | B1 | | 6/2002 | Yates |
| 2004/0224127 | A1 | * | 11/2004 | DiBattista et al. ............ 428/137 |
| 2004/0241479 | A1 | * | 12/2004 | Domine et al. ............... 428/515 |

FOREIGN PATENT DOCUMENTS

| EP | 1382520 | 1/2004 |
| EP | 1996447 B1 | 12/2009 |
| GB | 2224248 | 5/1990 |
| WO | 2004031025 | 4/2004 |
| WO | 2006085202 | 8/2006 |

* cited by examiner

*Primary Examiner* — Gerard Higgins
*Assistant Examiner* — Sathavaram I Reddy
(74) *Attorney, Agent, or Firm* — Themis Law

(57) ABSTRACT

A human body support comprises a composite material base frame (2) having a top surface (11) and a bottom surface (10) and a cover element '(3) formed from a first polymer material (3) associated to the base frame (2). The support further comprises at least one film of a second thermoplastic polymer material (8) which is fixedly attached to the base frame (2). The second thermoplastic material (8) has an affinity with the first polymer material (3) so that the cover element may be fixedly attached to the base frame, thereby forming an integral support. A polymethane gel (4) may be disposed in a recess of the base frame (2). The first polymer material (3) has a thickness of 0.1 to 0.3 mm, and the second material (8) has a thickness of 0.01 to 0.025 mm, both may be optically transparent.

9 Claims, 3 Drawing Sheets

COMPOSITE MATERIAL HUMAN BODY SUPPORT AND PROCESS FOR MAKING SAME

FIELD OF THE INVENTION

The present invention is applicable to the field of sport and leisure accessories and particularly relates to a composite material human body support and to a process for making same.

Typical examples of supports that can be formed according to the present invention include seat backrests, headrests, armrests and seats for anatomic chairs, especially designed for elderly and physically challenged people, footwear insoles, orthopedic and non-orthopedic mattresses, saddles and handlebars for bicycles, cycles, motorcycles and the like.

BACKGROUND OF THE INVENTION

Elastic supports of the above type are known to generally comprise a composite material base frame, a pad element made of a resilient material, usually expanded foam resin and/or gel, and a sheet cover element, which is designed to contact a seated user.

Typically, the frame of such supports is formed by in-mold hot curing of a thermosetting resin with one or more "skins" of fibrous material, such as carbon, fiberglass, Kevlar or the like embedded therein. The skins of fibrous material may be either dry or preimpregnated with the thermosetting resin when placed into the mold: in the former case, the thermosetting resin is directly injected into the mold.

When the cover element is formed of a polymer material due to aesthetic or light-weight requirements, a problem arises with the attachment of the composite material of the frame to the polymer material of the cover element.

International application PCT/IB2006/000144 discloses a composite material support structure comprising all the features as defined in the preamble of claim 1. In such prior art structure, the cover element is co-molded with the composite material frame, so that the cover element directly contacts the resin matrix of the composite material.

In practice, this solution has the drawback of imperfect adhesion between the frame and the cover element, which affects the mechanical properties of the finished support. The lack of affinity between the resin matrix of the frame and the polymer material of the cover element causes air bubble formation and discontinuity at the interface between the latter and the frame.

Thus, there still exists the problem of providing supports having a composite material frame attached to a cover element made of a polymer material, which exhibit good mechanical properties.

A further well-known problem of the above prior art support is that, when cuts or recesses are to be formed on the base frame, e.g. to create peripheral comfort tabs, according to the teaching of patent application WO2004031025, such processing has to occur upstream or downstream from the support molding process.

For upstream processing, the skins of fibrous material have to processed, wherefore cutting will be rough and inaccurate due to the nature of such material. On the other hand, downstream processing has to be carried out on the wholly formed frame, thereby causing such frame to be mechanically weakened.

In either case, the problem of forming a composite material support of high strength with high precision processing on the frame has not been solved to date.

SUMMARY OF THE INVENTION

The main object of this invention is to overcome the above drawbacks, by providing a human body support that is highly efficient and relatively cost effective.

A particular object is to provide a support having a composite material frame attached to a cover element made of a polymer material, which exhibits good mechanical properties.

Another object of the invention is to provide a practical and easily repeatable process for making a support.

Another object of the invention is to provide a process for making a support which allows for high precision processing on the frame, while ensuring high strength of the final product.

These and other objects, as better explained hereafter, are fulfilled by a human body support as defined in claim 1, which comprises a composite material base frame having a top surface and a bottom surface and a cover element formed from a first polymer material associated to the base frame.

According to the invention, the support comprises at least one film of a second thermoplastic polymer material which is fixedly attached to said base frame at least at one of the top or bottom surfaces. The second thermoplastic material has an affinity with the first polymer material.

This particular configuration allows to fixedly attach the cover element to the base frame to obtain an integral support having very good mechanical properties.

The use of a film made from a second thermoplastic material having an affinity with the first polymer material of the cover element allows fixed attachment of the latter to the base frame, while preventing any air bubble formation and discontinuity typically found in prior art supports.

The term "composite material" as used herein is meant to indicate a material comprising a fibrous reinforcing element, such as carbon fiber, glass fiber, Kevlar fiber or the like, embedded in a polymer matrix, usually a thermosetting resin. The reinforcing element may include one or more "skins", i.e. substantially sheet-like elements.

Furthermore, the term "affinity materials" as used herein is meant to indicate materials having a chemical and/or physical affinity with each other, i.e. materials that, while in joined relationship, provide a junction adapted to support the transfer of tensile or shear stresses through the contact surface. The highest affinity is thus achieved between identical materials.

The term "junction" as used herein, is meant to indicate the sum of adhesive strength, which is mainly of a physical nature and caused by mutual electrostatic interactions generated at the contact surface, and cohesive strength, which is mainly of a chemical nature and caused by chemical bonds generated at the contact surface.

In another aspect, the invention relates to a process for making composite material human body supports, as defined in claim 13, which comprises the steps of: a) molding a base frame having a top surface and a bottom surface; b) associating a cover element made from a first polymer material to the base frame to obtain an integral human body support.

According to the invention, in the molding step a) at least one film of a second thermoplastic polymer material is fixedly attached to the base frame at least at one of the top and bottom surfaces. The second thermoplastic material has an affinity with the first polymer material.

This sequence of steps forms an easy and repeatable process for making a human body support having very good mechanical properties.

Advantageously, the process of the invention may comprise a step, in which the base frame is processed by removal and/or at least partial deformation of its base material, which is executed upstream from the molding step a) and downstream from the associating step b).

Thus, high precision processing may be performed on the frame, while preserving the high strength of the final support.

BRIEF DESCRIPTION OF THE DRAWINGS

Further features and advantages of the invention will be more apparent from the detailed description of one preferred but non-exclusive embodiment of a process according to the invention, which is described as a non-limiting example with the help of the annexed drawings, in which.

DETAILED DESCRIPTION OF A PREFERRED EMBODIMENT

Figure 1:
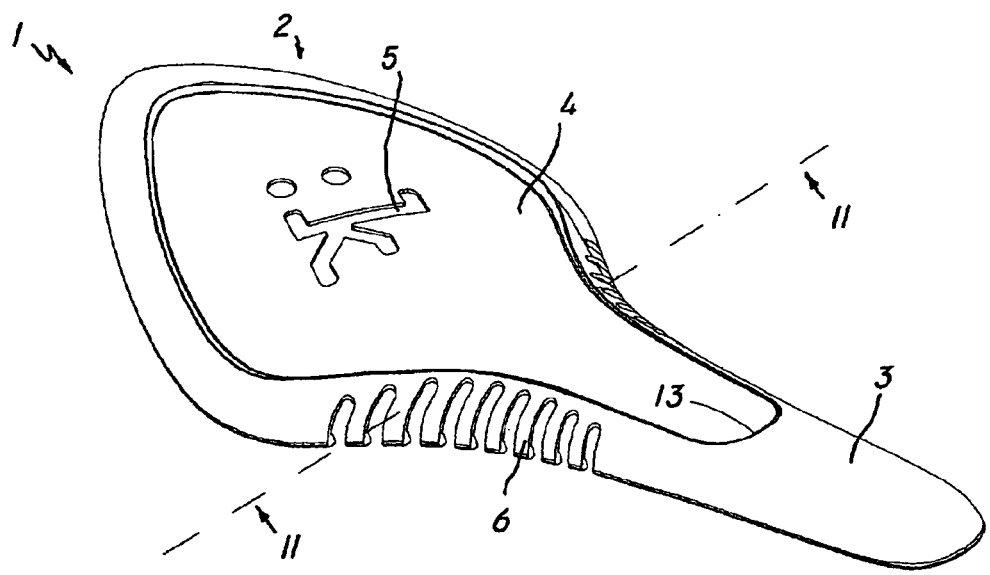
FIG. 1 is an axonometric view of a support of the invention.

The support of the invention, generally designated by numeral 1, comprises a base frame 2 made of composite material with a cover element 3 made from a first polymer material.

The support may further have a pad element 4 between the base frame 2 and the cover element 3, which can comprise at least one layer of a resilient material such as foam or a polyurethane gel, which is designed to contact a seated user.

In a preferred non exclusive embodiment, the support 1 may have a decorative element 5 on the frame 2, such as a carved low-relief logo 5, and/or a comfort element 6, such as a series of peripheral fins according to the teachings of patent application WO2004031025. However, it will be understood that any other processing may be carried out on the frame 2, by removal or at least partial deformation of its base material, without departure from the scope as defined in the annexed claims.

Figure 2:
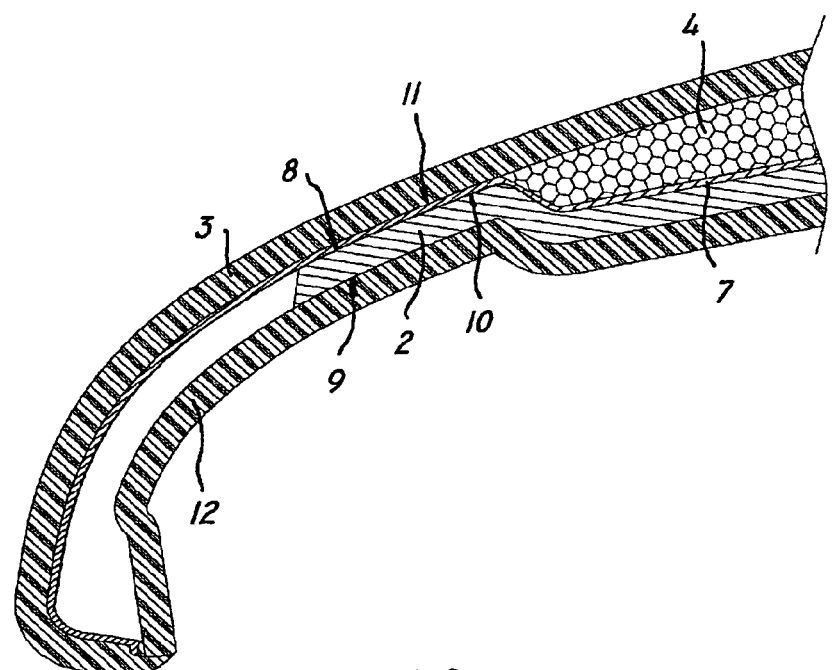
FIG. 2 is a sectional view of the support of FIG. 1, as taken along a plane II-II.

According to the invention, as particularly shown in FIG. 2, there is provided a film 7 of a second thermoplastic polymer material which is stably attached to the base frame 2 in correspondence of its top surface 8. The second thermoplastic material of the film 7 has an affinity with the first polymer material of the frame 2 so that the cover element 3 may be stably attached to the frame 2. It will be understood that the film 7 may also be attached to the bottom surface 9 of the frame 2 without departure from the scope as defined in the annexed claims.

Thus the film will actually act as a "solid glue" which bridges between the frame 2 and the cover element 3. The film 7 has its bottom face 10 in contact with the frame 2, and at least partly penetrates its resin matrix, whereas the other face 11 is free, with the cover element 3 being designed to be laid thereon.

Advantageously, for maximum affinity, the second thermoplastic material of the film 7 and the first polymer material of the cover element 3 may be identical. In a preferred, non exclusive embodiment, both the first and the second materials may be an optically transparent thermoplastic polyurethane, or may be selected from the group comprising polyester, polyamide and polymers comprising epoxy groups. It will be understood that any other material, whether optically transparent or not, may be used without departure from the scope as defined in the annexed claims.

Conveniently, the film 7 may be relatively thin and have a thickness of 0.01 mm to 0.05 mm, and preferably of about 0.025 mm.

The cover element 3 may comprise at least one layer of polymer material, having a thickness of 0.1 mm to 0.3 mm, and preferably of about 0.2 mm.

It will be understood that the cover element 3 may also comprise more than one layer, whether of polymer material or the like, without departure from the scope as defined in the annexed claims. However, in this case the base layer, i.e. the one in contact with the film 7 has to be formed from the first polymer material, having an affinity with the first thermoplastic material thereof.

In a preferred, non exclusive embodiment, as shown in the figures, the support 1 may also have an additional cover layer 12 at the bottom surface 9 of the frame 2, which may be also formed from an optically transparent thermoplastic polyurethane.

As shown in FIG. 1, the base frame 2 may have a recessed seat 13 designed for housing the pad element 4.

The latter may be advantageously made of a viscoelastic material that has an affinity with at least one of the first polymer material of the cover element 3 and/or the second thermoplastic material of the film 7.

For maximum affinity, and for optimized mechanical properties of the support 1, the cover element 3, the film of thermoplastic material 7 and the lower layer 12 may be formed of thermoplastic polyurethane, possibly transparent for the decorative element 5 to be visible, and the viscoelastic material of the pad element 4 may be selected from the group comprising polyurethane gels.

A process for making the support 1 has two successive steps.

In the first step a) a base frame with a top surface 8 and a bottom surface 9 is molded. During this step, the film 7 is fixedly attached to the base frame 2 under heat, e.g. by co-molding thereof in a first mold 14, possibly having a protrusion 15 for forming the receptacle 13 on the frame 2.

It will be understood that the film of thermoplastic material 7 may be laid either on the upper surface 8 or on the bottom surface 9 without departure from the scope as defined in the annexed claims.

Next, a step b) may take place, in which the cover element 3 is associated to the base frame 2, with the film previously attached thereto, and possibly to the pad element 4. This step may occur in a second mold 16, that may be other than the first mold 14. However, it will be understood that the steps a) and b) of the inventive process may take place in one mold, without departure from the scope as defined in the annexed claims.

Figure 3:
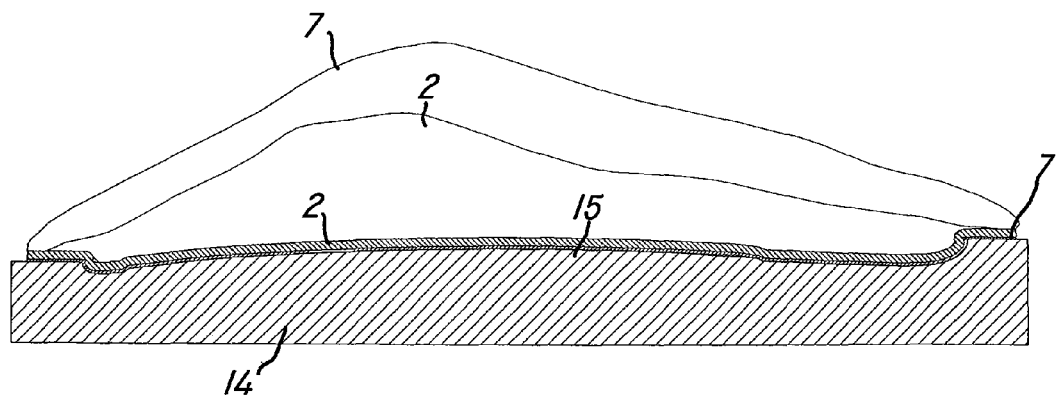
FIG. 3 is a sectional view of a step of the process of the invention.
Figure 4:
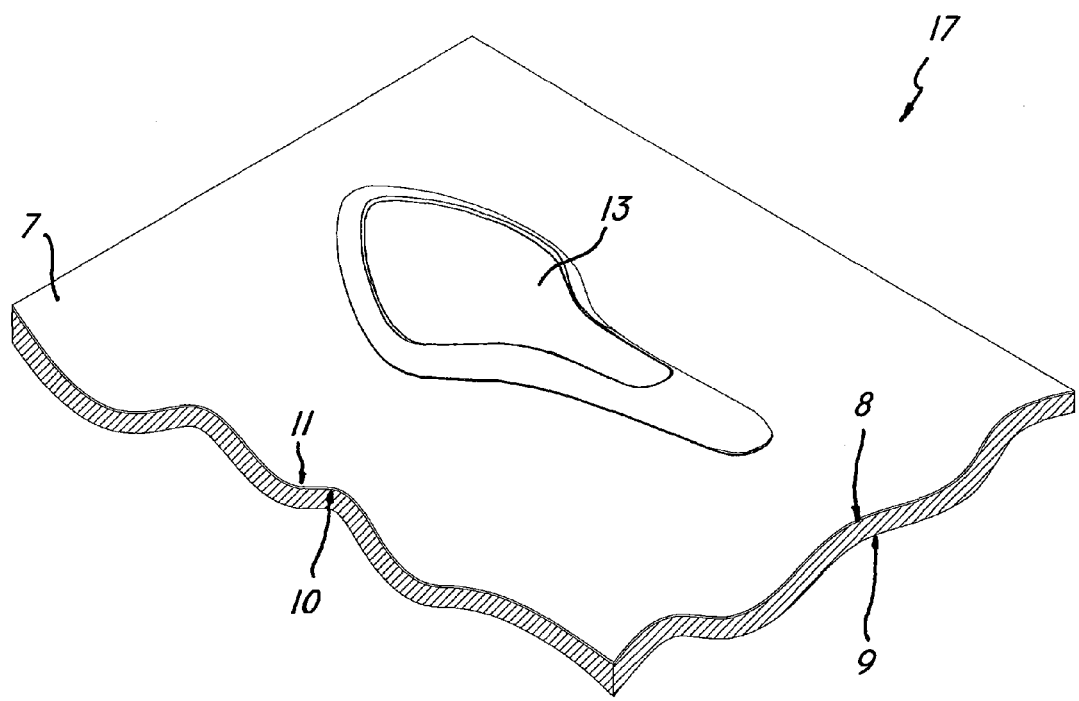
FIG. 4 is an axonometric view of a frame in an intermediate process step.
Figure 5:
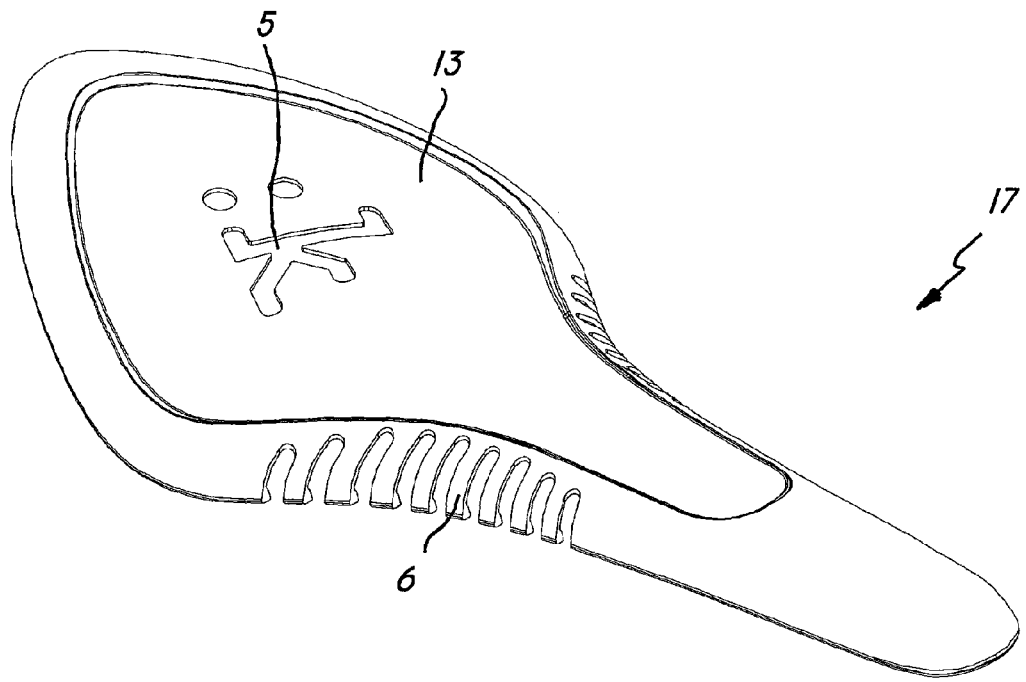
FIG. 5 is another axonometric view of a frame in an intermediate process step.
Figure 6:
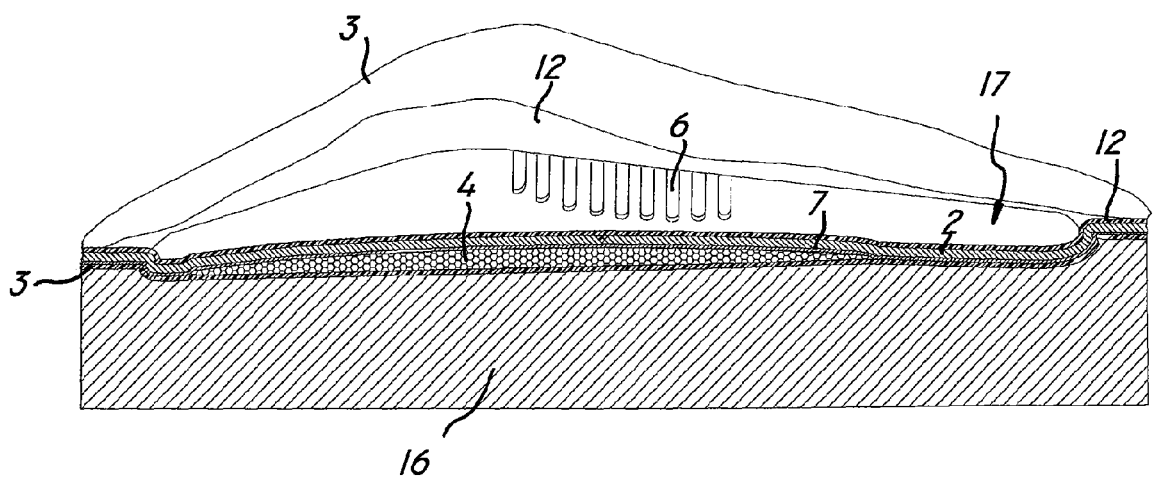
FIG. 6 is a further sectional view of a step of the process of the invention.

According to one embodiment of the invention, the reinforcing element of the frame may be introduced in the first mold 14, in a dry or preimpregnated state, in combination with the film 7, as shown in FIG. 3. The reinforcing element may include one or more "skins" of fibrous material, such as carbon fiber, Kevlar fiber, glass fiber or the like.

Thus an intermediate frame 17 is formed, which is removed from the mold and possibly submitted to a processing step by removal and/or at least partial deformation of its base material, e.g. to form peripheral fins 6 or the decorative element 5.

Advantageously, this processing step may be executed with CNC machines and by cutting processes selected from the group comprising chip formation, cutting, laser cutting, water-jet cutting or the like, with computer-controlled equipment.

It will be understood that the term "intermediate frame" as used herein is meant to indicate the frame 2 in the intermediate process step after the step a) and before the step b).

In a non exclusive embodiment of the invention, the step of laying the film of thermoplastic material 7 takes place before forming the intermediate frame 17, i.e. by laying the film 7 directly on the reinforcing element, in either a dry or a pre-impregnated state, and before introducing the latter and possibly the polymer matrix in the mold.

It will be understood that such step may be also separated in time from the molding step a), e.g. occurring the day before, and a more or less extended step in which the reinforcing element—thermoplastic film assembly is at rest may be also provided, without departure from the scope as defined in the annexed claims.

Otherwise, laying of the thermoplastic film 7 may occur after forming the intermediate layer 17, by laying the film 7 on an at least partly cured intermediate layer 17, without departure from the scope as defined in the annexed claims.

In either case, the first mold 14 may be heated to the incipient melting temperature of the resin that forms the matrix of the frame. Thus, the film 7 of thermoplastic material starts to soften and penetrate the resin, until it is at least partly embedded therein, and thence fixedly attached thereto.

It will be further understood that a finishing step may be provided for the intermediate layer 17, which contemplates, for instance, removal of the base material exceeding the size of the frame 17, without departure from the scope as defined in the annexed claims.

Advantageously, the polymer matrix may be associated to the reinforcing element by impregnation prior to laying thereof in the mold 14, e.g. by an impregnation step in another mold or anyway separately.

It will be understood that, if the support 1 also incorporates the pad element 4, any process for attaching the frame 2 thereto may be used without departure from the scope as defined in the annexed claims. As a non-limiting example, the pad element 4 may be formed separately and glued or heat-sealed to the frame 2, or obtained by co-molding with the frame 2.

FIG. 2 shows a sectional view of the support 1, as taken along a plane II-II. As shown in this figure, the frame 2 is covered by an overlying thermoplastic film 1, with the cover element 3 being bonded thereon. The lower cover layer 12 is bonded to the bottom of surface 9.

Suitably, the frame 2 and the cover element 3 may be integrally associated to each other by heating the second mold 16 to a predetermined temperature, possibly the incipient melting temperature of the polymer material of the cover element 3. During this step, a junction will be formed between the film 7 and the cover element 3.

The above disclosure clearly shows that the support and process of the invention fulfill the intended objects and particularly meet the requirement of providing supports having a composite material frame attached to a cover element made from a polymer material that exhibit very good mechanical properties.

The support and process of this invention are susceptible of a number of changes and variants, within the inventive principle disclosed in the appended claims. All the details thereof may be replaced by other technically equivalent parts, and the scope of the invention.

While the support and process have been described with particular reference to the accompanying figures, the numerals referred to in the disclosure and claims are only used for the sake of a better intelligibility of the invention and shall not be intended to limit the claimed scope in any manner.

The invention claimed is:

1. A bicycle saddle comprising:
    a base frame of the saddle having a top surface and a bottom surface;
    an outermost layer of the saddle formed from a first thermoplastic polymer material and associated to said base frame, said outermost layer being a cover element of the saddle;
    at least one film of a second thermoplastic polymer material having a top face and a bottom face and stably coupling said base frame to said cover element,
    wherein said cover element is formed from at least one layer of said first thermoplastic polymer material, said base frame being made of a composite material comprising one or more skins of a fibrous material embedded in a polymer matrix including a thermosetting resin, said at least one film having its top face adhered to said cover element and its bottom face adhered to said base frame in correspondence of at least one of said top or bottom surfaces, said at least one film having the thickness less than half the thickness of said at least one layer of said first polymer thermoplastic material, said second thermoplastic material having one or more of a physical or chemical affinity with said first polymer thermoplastic material to provide a junction therebetween, wherein said cover element and said base frame are molded to one another; and
    a pad element made of a viscoelastic material located between said base frame and said cover element,
    wherein said pad element is disposed within a recessed portion of said base frame extending for less than the entirety of said base frame, said pad element being coupled to said base frame by said at least one film, and
    wherein at least some of said at least one film of a second thermoplastic polymer material is penetrates the thermosetting resin of the base frame.

2. The bicycle saddle as claimed in claim 1, wherein said second thermoplastic polymer material and said first thermoplastic polymer material are identical.

3. The bicycle saddle as claimed in claim 1, wherein said first thermoplastic polymer material and said second thermoplastic polymer material are selected from the group comprising polyurethanes, polyamides and polyesters.

4. The bicycle saddle as claimed in claim 1, wherein said first thermoplastic polymer material and said second thermoplastic polymer material are optically transparent.

5. The bicycle saddle as claimed in claim 1, wherein the thickness of said at least one film of a second thermoplastic polymer material is of 0.01 mm to 0.05 mm.

6. The bicycle saddle as claimed in claim 1, wherein said at least one layer of the first thermoplastic polymer material has a thickness of 0.1 mm to 0.3 mm.

7. The bicycle saddle as claimed in claim 1, wherein said base frame has a recessed seat for having said pad element.

8. The bicycle saddle as claimed in claim 7, wherein said viscoelastic material has an affinity with at least one of said first thermoplastic polymer material or second thermoplastic polymer material.

9. The bicycle saddle as claimed in claim 1, wherein said viscoelastic material is selected from the group of polyurethane gels.

* * * * *